(12) United States Patent
Evanovich et al.

(10) Patent No.: US 8,349,173 B2
(45) Date of Patent: Jan. 8, 2013

(54) REPLACABLE FILTER ELEMENT WITH SHIELDED BOTTOM BYPASS VALVE

(75) Inventors: Steven R. Evanovich, Pittsburgh, PA (US); Augustus O Schroeder, Pittsburgh, PA (US); Robert B Murad, Fortson, GA (US)

(73) Assignee: Schroeder Industries, LLC, Leetsdale, PA (US)

( * ) Notice: Subject to any disclaimer, the term of this patent is extended or adjusted under 35 U.S.C. 154(b) by 653 days.

(21) Appl. No.: 12/536,961

(22) Filed: Aug. 6, 2009

(65) Prior Publication Data

US 2010/0032362 A1    Feb. 11, 2010

Related U.S. Application Data

(60) Provisional application No. 61/086,537, filed on Aug. 6, 2008.

(51) Int. Cl.
*B01D 35/147* (2006.01)

(52) U.S. Cl. .................. 210/130; 210/430; 210/497.01

(58) Field of Classification Search ............... 210/130, 210/131, 133, 429, 430, 431, 305, 309, 308, 210/438, 493.5, 497.01, 456; 55/313
See application file for complete search history.

(56) References Cited

U.S. PATENT DOCUMENTS

| | | | |
|---|---|---|---|
| 3,229,817 A * | 1/1966 | Pall | 210/130 |
| 4,428,834 A | 1/1984 | McBroom et al. | |
| 4,935,128 A * | 6/1990 | Hoeptner, III | 210/130 |
| 6,887,376 B2 * | 5/2005 | Cella et al. | 210/188 |
| 7,384,547 B2 | 6/2008 | Evanovich et al. | |
| 7,754,069 B2 * | 7/2010 | Shoji et al. | 210/90 |

FOREIGN PATENT DOCUMENTS

DE    3718068 C  *  6/1988

OTHER PUBLICATIONS

EPO Machine Translation of DE 3718068C; Jun. 1988.*

* cited by examiner

*Primary Examiner* — Terry Cecil
(74) *Attorney, Agent, or Firm* — Blynn Shideler; Krisanne Shideler; BLK Law Group

(57) ABSTRACT

A replaceable inside out flow filter element comprises an annular filter media structure; an upper end cap attached one end of the media structure; a lower end cap attached to an opposed end of the media structure, with an inner annular bypass mounting sidewall formed on the lower end cap; a bypass valve assembly secured to the inner annular bypass mounting sidewall and configured to communicate with the radial inner side of the annular filter media structure; and an annular bypass shield tube coupled to the bypass mounting sidewall and extending above the bypass valve assembly toward the upper end cap, wherein the inner annular bypass mounting sidewall and the annular bypass shield tube combine with the radial inner side of the media structure to define an annular particulate receiving area that extends about at least ½ of the length of the media structure from the lower end cap.

20 Claims, 1 Drawing Sheet

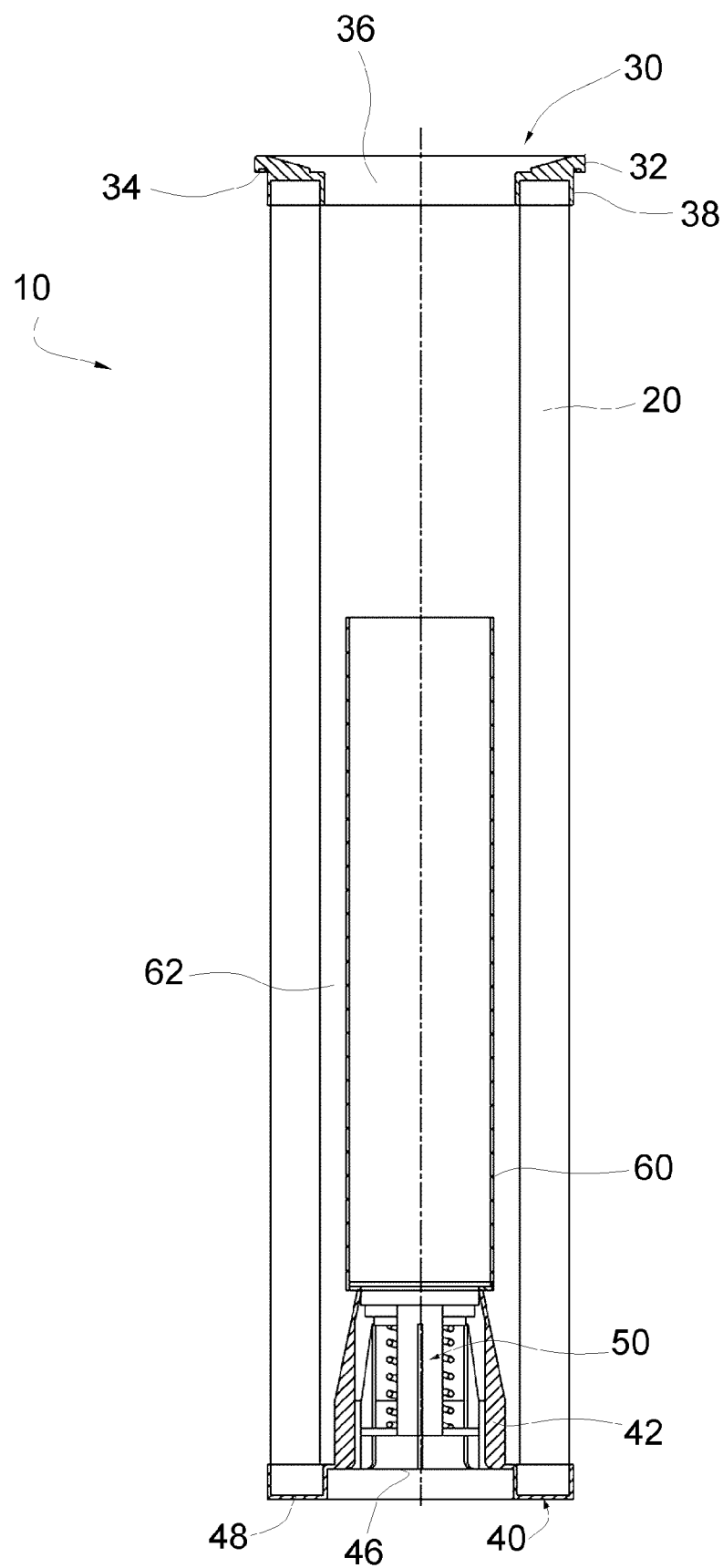

REPLACABLE FILTER ELEMENT WITH SHIELDED BOTTOM BYPASS VALVE

CROSS REFERENCE TO RELATED APPLICATIONS

The present application claims the benefit of U.S. provisional application Ser. No. 61/086,537 entitled "Replaceable Filter Element with Shielded Bottom Bypass Valve" filed Aug. 6, 2008.

BACKGROUND OF THE INVENTION

1. Field of the Invention

The present invention relates to replaceable filter elements. Specifically, the present invention relates to a drop in, inside-out flow replaceable filter element with shielded bottom bypass valve.

2. Background Information

Industrial fluids are critical in many industrial machines and include hydraulic fluids, lubricating fluids, cooling fluids, liquid fuels and others. The phrase industrial fluid is intended to be comprehensive of these fluids and others and is equivalent to the term working fluid herein. In many of these applications the industrial fluid is in a circulating system. For example, hydraulic fluids are typically found in a circulating hydraulic system, wherein such systems are frequently used in heavy machinery, including cranes, backhoes, demolition shears, bulldozers, and the like. In such circulating hydraulic systems, it is important to keep the hydraulic fluid free of debris. Consequently, filter units or filter assemblies have been incorporated in the hydraulic systems to filter debris from the hydraulic fluid. Lubricating fluid, e.g. oil, will be found in circulating lubrication systems, wherein such systems have also incorporated filter assemblies to clean the working fluid. Fuel systems utilizing liquid fuels have also incorporated filter assemblies to clean the fuel, however the fuel systems do not, typically, re-circulate the working fluid. The phrase circulating industrial fluid or circulating working fluid is intended to be comprehensive of industrial fluids in a circulating system.

It is common to form the filter assembly with a replaceable filter element. One common configuration is a tubular filter media in which the fluid being cleaned flows in a radial direction through the tubular pleated media. The direction of flow in such a structure defines the filter element as an outside-in (flow of fluid being cleaned is inward radial direction) or an inside-out (flow of fluid being cleaned is outward radial direction) filter structure. Examples of the tubular structure type filter elements include the K series element sold by Schroeder Industries, LLC, with the direction of flow for this element being defined by the associated assembly.

From an operational standpoint there are certain advantages to outside-in flow and other advantages with inside-out flow. Namely with outside-in flow the pleat structure can be more stable at higher pressure when constructed with a traditional fan pleat. This structure also exhibits higher dirt holding capacity as compared to similar inside out designs, since the media pleats are uniformly exposed to the system flow which results in a more uniform distributed deposition pattern. See, for example, an outside in flow design filter described in the Assignee's U.S. Pat. No. 7,384,547 entitled "Replaceable Filter Element with Integral Annular Trap" which is incorporated herein by reference. An inside out flow design is shown in U.S. Pat. No. 4,428,834. Numerous other patents illustrate inside out and outside in flow designs.

Alternatively with inside-out flow there is an advantage in that trapped particles on the up-stream side of the filter remain in the center and are easily removed with the filter element, whereas in the outside in configurations such particles can, in theory, contaminate the system by falling or migrating past the filter location during filter element replacement.

The associated mounting structure of the filter element in the filter assembly housing will often differ between the inside out flow and the outside in flow designs. The inside out flow design is common where the filter element is a drop-in design that has the end cap on the inlet side engage the housing to support the element. This is sometimes called a vertical hanging element, although in many applications, such as vehicles, the filter element will not maintain a single vertical orientation as the housing moves with the vehicle.

Many if not most industrial fluid systems that utilize a filter assembly require a bypass valve to be associated with the filter assembly. The purpose of the bypass valve is to allow the working fluid to bypass the filter assembly in certain critical situations. In general, the bypass opens if the pressure drop becomes too large across the filter assembly, i.e. above a set operating pressure of the bypass valve. The bypass operation, i.e. working fluid moving through the open bypass valve and bypassing the filter media, is not the standard operating condition of such filter assemblies and, when triggered, can be an indication that the filter element is in need of replacement. For example as the pleated media of a filter element becomes clogged then the pressure drop across the media increases causing the bypass valve to move to the open position. Further, bypass operation may also be triggered with the starting of a system, also known as cold starts, where the pressure gradient across the filter element exceeds the bypass valve threshold at the start (and then closes with the movement of fluid). One conventional bypass valve configuration is a spring biased poppet valve.

It is known in the art, and even common, to incorporate bypass valves into replaceable filter elements. In a drop in type, inside out flow replaceable filter element it has been known to incorporate a bypass valve in the lower end cap structure. Although a very convenient bypass valve placement for not interfering with other flow aspects of the filter assembly, this configuration has lead to certain contamination issues. As noted above, in the inside out flow elements particulate material that is filtered out of the working fluid by the filter media remains on the inside of the filter element structure in the normal operation of the filter element. This particulate material can and does become dislodged from the filter media and then settles to the bottom of the filter element, effectively covering (even caking) the bypass valve structure. With the operation of the bypass valve the (previously filtered) particulate material can move through the open bypass valve and contaminate the system. The problem can become more concerning where the bypass valve operates at times other than near the end of the useful life of the filter element, such as cold starts as noted above.

In cold starts of some systems, the working fluid is cool or cold and exhibits higher viscosity than at normal operating temperatures which results in higher differential pressure drop through filter elements. During this common situation, the pressure drop may be great enough to cause the bypass valve to open until the system begins flowing and normal operation commences. Contamination that settles on or in the vicinity of the bypass valve opening are flushed through the bypass valve when it opens and migrates downstream of the filter assembly. When such events occur, large amounts of previously filtered contamination may be released into the working fluid which endangers sensitive system components.

There remains a need to improve the operation of inside out flow, drop in type filter elements having integrated lower bypass valves to minimize the ability of dislodged filter particulates from moving beyond the filter element and re-entering the system.

SUMMARY OF THE INVENTION

In accordance with one aspect of the invention, the problems set out above are solved by a replaceable, inside out flow, drop in tubular filter element with a shielded bottom bypass valve according to the present invention. The replaceable, inside out flow filter element with shielded bottom bypass valve according to the present invention provides a simple, efficient, tubular filter element that minimizes the flow of contaminates through the open bypass valve.

In accordance with one non-limiting embodiment of the present invention, the invention includes a replaceable inside out flow filter element comprising an annular filter media structure; an upper end cap attached to an upper end of the annular filter media structure, the upper end cap including a support member configured to engage associated structure on a filter assembly to support the filter element, and including a center opening configured to allow inflow of industrial fluid to the radial inner side of the annular filter media structure there through; a lower end cap attached to a lower end of the annular filter media structure opposed from the upper end cap, an inner annular bypass mounting sidewall formed on the lower end cap, wherein the inner annular bypass mounting sidewall is spaced in a radial inward direction from the radial inner side of the media structure; a bypass valve assembly secured to the inner annular bypass mounting sidewall of the lower end cap and configured to communicate with the radial inner side of the annular filter media structure; and an annular bypass shield tube coupled to the bypass mounting sidewall and extending above the bypass valve assembly toward the upper end cap, wherein the annular bypass shield tube is spaced in a radial inward direction from the radial inner side of the media structure.

In one non-limiting embodiment of the invention the inner annular bypass mounting sidewall of the lower end cap and the annular bypass shield tube combine with the radial inner side of the media structure to define an annular particulate receiving area that extends about at least ⅓ of the length of the media structure from the lower end cap. The annular particulate receiving area may extend about at least ½ of the length of the media structure from the lower end cap. The annular particulate receiving area may extend about ⅔ of the length of the media structure from the lower end cap.

In one non-limiting embodiment of the invention the media structure includes pleated media; the support member includes an annular ledge and a sealing ring supported in the ledge; and wherein the bypass valve assembly is a spring biased valve structure and is above a lower end of the lower end cap.

These and other advantages of the present invention will be clarified in the description of the preferred embodiment taken together with the attached FIGURE.

BRIEF DESCRIPTION OF THE DRAWING

Other objects and advantages appear in the following description and claims. The enclosed drawing illustrates a practical embodiment of the present invention, without intending to limit the scope of the invention or the included claims. FIG. 1 is a sectional side view of a drop in, vertically hanging, inside out flow, replaceable filter element with shielded bottom bypass valve according to one aspect of the present invention.

DETAILED DESCRIPTION OF THE PREFERRED EMBODIMENTS

As will be described in greater detail below the present invention provides a drop in, vertically hanging, inside out flow, replaceable filter element 10 with shielded bottom bypass valve. The phrase "inside out flow", or "inside out", as well as "outside in", within the meaning of this application refers to the radial direction of flow of the working fluid being cleaned through the associated generally annular media structure of the subject filter element. The phrase "replaceable filter element" references filter element that is part of a filter assembly that is intended to be periodically serviced through replacement of the associated filter media, wherein the components associated with the replaced filter media (e.g. the end caps, media and bypass valve) form the replaceable filter element. The phrase "drop in" references a replacement filter element that is, generally, axially slid into the associated filter assembly, which is also called a filter housing. Often the orientation of the filter assembly allows for gravity to assist in the movement of the replacement filter element into position, which feature is where the phrase "drop in" originates. The phrase "vertically hanging" or merely "hanging" references a filter element that is supported by the upper end cap. "Lower" and "Upper" are only used herein in reference to the relative position of the elements in the illustrated drawings, and not to define specific rigidly required orientations of these elements in operation. The "vertical hanging" is not intended to define a rigid upright orientation of the filter element 10. The subject filter element 10 could be angled or even turned "horizontally" in actual implantation from what is shown without changing many of the aspects of the invention. It is expected that in many mobile applications the filter element 10 will move through a wide range of physical orientations to ground in normal operation. However, as will be apparent form the following description, many of the advantages of the present invention are achieved if there remains, generally, some type of vertical orientation to the filter element 10.

The filter element 10 includes an annular filter media structure 20. The media structure 20 preferably includes pleated media. Additionally the media structure 20 also typically includes support structure, such as a mesh or perforated rigid outer support tube, for the element 10. The pleated media is typically formed of a number of plies of media layer. The particular media materials forming the pleated media can be varied depending on the application, as known in the art. The specific construction of the media structure 20, including the pleated media is known in the art.

The filter element 10 includes a solid upper end cap 30 attached to an upper end of the annular filter media structure 20. The end cap 30 can be metal, plastic or other material that can provide the support needed for the element 10. The upper end cap 30 including a support member 32 configured to engage associated structure on a filter assembly to support the filter element. The support member 32 is formed of an annular ledge that houses a sealing member 34 such as an o-ring or gasket. The sealing member or sealing ring 34 will provide a secure seal against the associated support structure of the filter assembly housing.

The upper end cap 30 includes a center opening 36 configured to allow inflow of industrial fluid to the radial inner side of the annular filter media structure 20 there through. The upper end cap 30 can be effectively formed with an annular groove 38 receiving the media structure 20 therein to assist in the securing therebetween. Any conventional attachment between the end cap 30 and the media structure 20 can be used, such as adhesive, welding, combinations thereof, and other known attachments. Further the rear surface of the end cap 30 may be configured to receive and properly position hold down members, e.g., a spring biased member, of the filter assembly that are used to keep the filter element secure and sealed in position.

The filter element 10 includes a lower end cap 40 attached to a lower end of the annular filter media structure 20 opposed from the upper end cap 30. The lower end cap 40 can be formed of the same material as the upper end cap 30 and attached to the media structure 20 in a similar manner. The lower end cap 40 includes an inner annular bypass mounting sidewall 42 formed on the lower end cap 40. As shown in FIG. 1, the inner annular bypass mounting sidewall 42 is spaced in a radial inward direction from the radial inner side of the media structure 20. The inner annular bypass mounting sidewall 42 defines a bypass opening 46 in the lower end cap 40. The lower end cap 40 includes an annular groove 48 receiving the media structure 20 therein to assist in the securing therebetween, similar to groove 38 discussed above.

The filter element 10 includes a bypass valve assembly 50 secured to the inner annular bypass mounting sidewall 42 of the lower end cap 40 and configured to communicate with the radial inner side of the annular filter media structure 20. The bypass valve assembly 50 is a spring biased valve structure and is above a lower end of the lower end cap 40. The spring biased bypass valve assembly 50. The bypass valve 50 will operate in a conventional fashion whereby when the pressure drop across the filter element exceeds the set value of the spring, the bypass valve will open and the industrial fluid can bypass the media structure 24 and move through the bypass 50 and opening 46.

The filter element 10 includes a solid (imperforate) annular bypass shield tube 60 coupled to the bypass mounting sidewall 42 and extending above the bypass valve assembly 50 toward the upper end cap 30, wherein the annular bypass shield tube 60 is spaced in a radial inward direction from the radial inner side of the media structure 20. The inner annular bypass mounting sidewall 42 of the lower end cap 40 and the annular bypass shield tube 60 combine with the radial inner side of the media structure 20 to define an annular particulate receiving area 62 that extends about at least ⅓ of the length of the media structure 20 from the lower end cap 40. More preferably the annular particulate receiving area 62 that extends about at least ½ of the length of the media structure 20 from the lower end cap 40. The annular particulate receiving area 62 as shown extends about ⅔ of the length of the media structure 20 from the lower end cap 40.

The bypass shield tube 60 can be formed of metal, plastic and can be formed integral with the sidewall 42 or the bypass valve 50. Effectively the area above the bypass valve 50 is the shield tube 60 and that below is the bypass mounting structure of sidewall 42. In the embodiment in which the tube 60 is formed integral with the bypass valve 50, then the area above the poppet valve is the tube 60. The tube 60 can be a straight constant diameter tube effectively as shown, a converging tube structure or a diverging tube structure, or combinations thereof. The tube could also have inwardly beveled wings at the end thereof.

The key to the design of the tube 60 is that it does not impede the flow of the working fluid through the filter element 10 in normal operation and acts to direct as much dislodged filter particles as possible to within the particulate receiving area 62, which prevents such captured particles from being transmitted through the bypass valve 50 when it is opened (e.g. cold start or filter clogging). During periods of non-operation of the circulating system, contamination dislodged from the media structure 20 is trapped within the particulate receiving area 62 and gravity settles to the bottom of this annular area. This trapped contamination at the bottom of the particulate receiving area 62 can, thus, not be flushed from the element during operation of the bypass valve 20. Further, the tube 60 cannot detrimentally effect the operation of the bypass valve 50 when it is in the operational open position.

A mesh tube 60 could replace the solid tube, but such a structure would be less effective at preventing particulates from moving to the bypass valve, however such a structure may be more effective than no such tube and be preferable for operating parameters of the filter element. The solid tube 60 has not shown to have any detrimental effects on the operation of the filter element of the present invention.

The tube 60 and sidewall 42 together with the inner side of the media structure 20 defines the annular particulate receiving area 62. It is believed that this area should be designed so as not to minimize the conventional operation of the filter element. Namely, the area 62 should be designed such that the measurable operating pressure drop across the filter element 10 of the invention should be substantially the same as the measurable pressure drop across the element 10 without the associated shielding tube (but including the bypass valve 50 and sidewall 42). "Substantially the same" relative to measurable pressure drops means within 5%, as that is the standard variance of filter elements themselves due to variance in filter media operation. The present invention illustrated in FIG. 1 was found to have substantially identical pressure drops when tested with and without the tube 60. Further, the particulate count of the downstream working fluid associated with "cold starts" (in which the bypass valve would open) was found to decrease from 50% to 400% with the use of the tube 60 of the present invention as compared to the same element with this feature removed. Thus the present invention has been found to offer considerable improvement in operation while not detrimentally effecting the standard operation of the associated element.

The present invention has been described with reference to specific details of particular embodiments thereof. It is not intended that such details be regarded as limitations upon the scope of the invention. It will be apparent that various modifications can be made without departing from the spirit and scope of the present invention. The precise scope of the invention is to be defined by the appended claims and equivalents thereto.

What is claimed is:

1. A replaceable inside out flow filter element (10) comprising:

an annular filter media structure (20);

an upper end cap (30) attached to an upper end of the annular filter media structure (20), the upper end cap (30) including a support member (32) configured to engage associated structure on a filter assembly to support the filter element, and including a center opening (36) configured to allow inflow of industrial fluid to the radial inner side of the annular filter media structure (20) there through;

a lower end cap (40) attached to a lower end of the annular filter media structure (20) opposed from the upper end cap (30), an inner annular bypass mounting sidewall (42) formed on the lower end cap (40), wherein the inner annular bypass mounting sidewall (42) is spaced in a radial inward direction from the radial inner side of the media structure (20);

a bypass valve assembly (50) secured to the inner annular bypass mounting sidewall (42) of the lower end cap (40) and configured to communicate with the radial inner side of the annular filter media structure (20); and an imperforate annular bypass shield tube (60) coupled to the bypass mounting sidewall (42) having a first end adjacent the bypass valve assembly (50) and extending above and away from the bypass valve assembly (50) toward the upper end cap (30) to a second end of the bypass shield tube (60), wherein the annular bypass shield tube (60) is spaced in a radial inward direction from the radial inner side of the media structure (20).

2. The replaceable inside out flow filter element (10) according to claim 1 wherein the inner annular bypass mounting sidewall (42) of the lower end cap (40) and the annular bypass shield tube (60) combine with the radial inner side of the media structure (20) to define an annular particulate receiving area (62) that extends about at least ⅓ of the length of the media structure (20) from the lower end cap (40).

3. The replaceable inside out flow filter element (10) according to claim 2 wherein the media structure (20) includes pleated media.

4. The replaceable inside out flow filter element (10) according to claim 3 wherein the support member (32) includes an annular ledge and a sealing ring (34) supported in the ledge.

5. The replaceable inside out flow filter element (10) according to claim 4 wherein the bypass valve assembly (50) is a spring biased valve structure and is above a lower end of the lower end cap (40).

6. The replaceable inside out flow filter element (10) according to claim 1 wherein the inner annular bypass mounting sidewall (42) of the lower end cap (40) and the annular bypass shield tube (60) combine with the radial inner side of the media structure (20) to define an annular particulate receiving area (62) that extends about at least ½ of the length of the media structure (20) from the lower end cap (40).

7. The replaceable inside out flow filter element (10) according to claim 6 wherein the media structure (20) includes pleated media.

8. The replaceable inside out flow filter element (10) according to claim 7 wherein the support member (32) includes an annular ledge and a sealing ring (34) supported in the ledge.

9. The replaceable inside out flow filter element (10) according to claim 8 wherein the bypass valve assembly (50) is a spring biased valve structure and is above a lower end of the lower end cap (40).

10. The replaceable inside out flow filter element (10) according to claim 6 wherein the support member (32) includes an annular ledge and a sealing ring (34) supported in the ledge, and wherein the bypass valve assembly (50) is a spring biased valve structure and is above a lower end of the lower end cap (40).

11. The replaceable inside out flow filter element (10) according to claim 1 wherein the inner annular bypass mounting sidewall (42) of the lower end cap (40) and the annular bypass shield tube (60) combine with the radial inner side of the media structure (20) to define an annular particulate receiving area (62) that extends about ⅔ of the length of the media structure (20) from the lower end cap (40).

12. The replaceable inside out flow filter element (10) according to claim 11 wherein the media structure (20) includes pleated media.

13. The replaceable inside out flow filter element (10) according to claim 12 wherein the support member (32) includes an annular ledge and a sealing ring (34) supported in the ledge.

14. The replaceable inside out flow filter element (10) according to claim 13 wherein the bypass valve assembly (50) is a spring biased valve structure and is above a lower end of the lower end cap (40).

15. A replaceable inside out flow filter element (10) comprising:

an annular filter media structure (20);

an upper end cap (30) attached to an upper end of the annular filter media structure (20), the upper end cap (30) including a support member (32) configured to engage associated structure on a filter assembly to support the filter element, and including a center opening (36) configured to allow inflow of industrial fluid to the radial inner side of the annular filter media structure (20) there through;

a lower end cap (40) attached to a lower end of the annular filter media structure (20) opposed from the upper end cap (30);

a bypass valve assembly (50) secured to the lower end cap (40) and configured to communicate with the radial inner side of the annular filter media structure (20);

an imperforate annular bypass shield tube (60) coupled to the lower end cap (40) having a first end adjacent the bypass valve assembly (50) and extending above and away from the bypass valve assembly (50) toward the upper end cap (30) to a second end of the bypass shield tube (60); and an annular particulate receiving area (62) adjacent the annular bypass shield tube and extending from the lower end cap toward the upper end cap (30) about at least ⅓ of the length of the media structure (20) from the lower end cap (40).

16. The replaceable inside out flow filter element (10) according to claim 15 wherein the annular particulate receiving area (62) extends about at least ½ of the length of the media structure (20) from the lower end cap (40).

17. The replaceable inside out flow filter element (10) according to claim 15 wherein the annular particulate receiving area (62) extends about at least ⅔ of the length of the media structure (20) from the lower end cap (40).

18. The replaceable inside out flow filter element (10) according to claim 15 wherein the annular particulate receiving area (62) is formed between an inner surface of the annular media structure and an inner annular bypass mounting sidewall (42) of the lower end cap (40) and the annular bypass shield tube (60) which is coupled to the bypass mounting sidewall (42) of the lower end cap (40).

19. A replaceable drop in, vertically hanging, inside out flow filter element (10) comprising:

an annular filter media structure (20) including pleated media;

an upper end cap (30) attached to an upper end of the annular filter media structure (20), the upper end cap (30) including a support member (32) configured to engage associated structure on a filter assembly to support the vertically hanging filter element, and including a center opening (36) configured to allow inflow of industrial fluid to the radial inner side of the annular filter media structure (20) there through;

a lower end cap (40) attached to a lower end of the annular filter media structure (20) opposed from the upper end cap (30), an inner annular bypass mounting sidewall (42) formed on the lower end cap (40), wherein the inner annular bypass mounting sidewall (42) is spaced in a radial inward direction from the radial inner side of the media structure (20);

a bypass valve assembly (50) secured to the inner annular bypass mounting sidewall (42) of the lower end cap (40) and configured to communicate with the radial inner side of the annular filter media structure (20), wherein the bypass valve assembly (50) is a spring biased valve structure and is above a lower end of the lower end cap (40); and an imperforate annular bypass shield tube (60) coupled to the bypass mounting sidewall (42) and having a first end adjacent the bypass valve assembly (50) extending above and away from the bypass valve assembly (50) toward the upper end cap (30) to a second end of the bypass shield tube (60), wherein the annular bypass shield tube (60) is spaced in a radial inward direction from the radial inner side of the media structure (20), wherein the inner annular bypass mounting sidewall (42) of the lower end cap (40) and the annular bypass shield tube (60) combine with the radial inner side of the media structure (20) to define an annular particulate receiving area (62) that extends about at least ½ of the length of the media structure (20) from the lower end cap (40).

20. The replaceable drop in, vertically hanging, inside out flow filter element (10) according to claim 19 wherein the annular particulate receiving area (62) extends about ⅔ of the length of the media structure (20) from the lower end cap (40).

\* \* \* \* \*